United States Patent
Takeda

(10) Patent No.: US 10,602,022 B2
(45) Date of Patent: Mar. 24, 2020

(54) AUTHENTICATION PROCESSING APPARATUS, METHOD, AND COMPUTER PROGRAM PRODUCT FOR AUTHENTICATING A USER

(71) Applicant: Saeko Takeda, Kanagawa (JP)

(72) Inventor: Saeko Takeda, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 15/289,615

(22) Filed: Oct. 10, 2016

(65) Prior Publication Data
US 2017/0118377 A1 Apr. 27, 2017

(30) Foreign Application Priority Data

Oct. 22, 2015 (JP) ................................. 2015-207868
Jun. 7, 2016 (JP) ................................. 2016-113708

(51) Int. Cl.
| | | |
|---|---|---|
| *G10L 21/038* | (2013.01) | |
| *H04N 1/44* | (2006.01) | |
| *G06F 21/34* | (2013.01) | |
| *H04N 1/00* | (2006.01) | |
| *H04L 29/06* | (2006.01) | |

(52) U.S. Cl.
CPC .......... *H04N 1/4426* (2013.01); *G06F 21/34* (2013.01); *H04N 1/00344* (2013.01); *H04N 1/4433* (2013.01); *H04L 63/083* (2013.01); *H04L 63/0853* (2013.01); *H04N 2201/0094* (2013.01)

(58) Field of Classification Search
None
See application file for complete search history.

(56) References Cited

U.S. PATENT DOCUMENTS 7,356,833 B2 * 4/2008 Byrne ..................... G06F 21/41
726/2
2009/0174894 A1 * 7/2009 Kamijo ................. G06F 21/608
358/1.15

(Continued)

FOREIGN PATENT DOCUMENTS

| JP | 2003-162691 | 6/2003 |
|---|---|---|
| JP | 2004-185281 | 7/2004 |
| JP | 2010-092456 | 4/2010 |

OTHER PUBLICATIONS

Smart Card Installation and Configuration Guide, Xerox, Ver. 3.0, Oct. 2014 including Way Back Machine page showing public access as of Nov. 27, 2014 (Year: 2014).*

(Continued)

*Primary Examiner* — Frantz Bataille
(74) *Attorney, Agent, or Firm* — Oblon, McClelland, Maier & Neustadt, L.L.P.

(57) ABSTRACT

Equipment includes: a user authentication unit configured to perform a user authentication process based on authentication information stored in a storage medium; a usage registration unit configured to register a request for using the authentication information, the request being transmitted from an application; a storage controller configured to store the authentication information acquired from the storage medium in a storage unit; and a notifier configured to send the authentication information stored in the storage unit to the application, regarding which the request is registered.

7 Claims, 11 Drawing Sheets

(56) References Cited

U.S. PATENT DOCUMENTS

| | | | |
|---|---|---|---|
| 2013/0254859 A1* | 9/2013 | Ohtaka | G06F 21/34 726/7 |
| 2014/0245414 A1* | 8/2014 | Eun | G06F 21/34 726/7 |
| 2015/0261746 A1 | 9/2015 | Shimazu | |
| 2016/0119491 A1 | 4/2016 | Takeda | |
| 2016/0127578 A1 | 5/2016 | Shimazu | |
| 2016/0328188 A1* | 11/2016 | Hamayama | G06F 3/1238 |

OTHER PUBLICATIONS

Xerox (Card Installation and Configuration Guidance Oct. 2014, Pub. Date Nov. 27, 2014) (Year: 2014).*

* cited by examiner

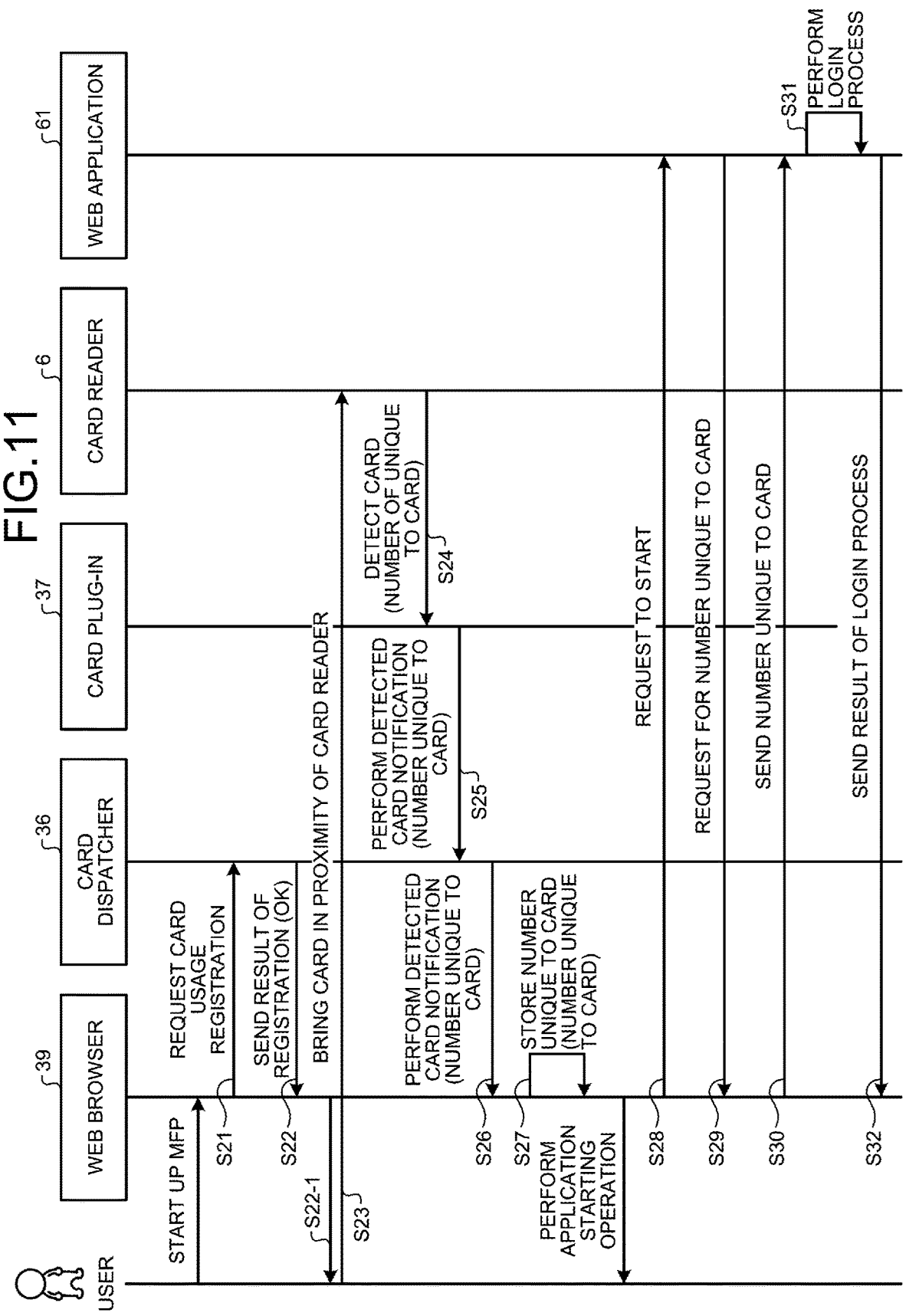

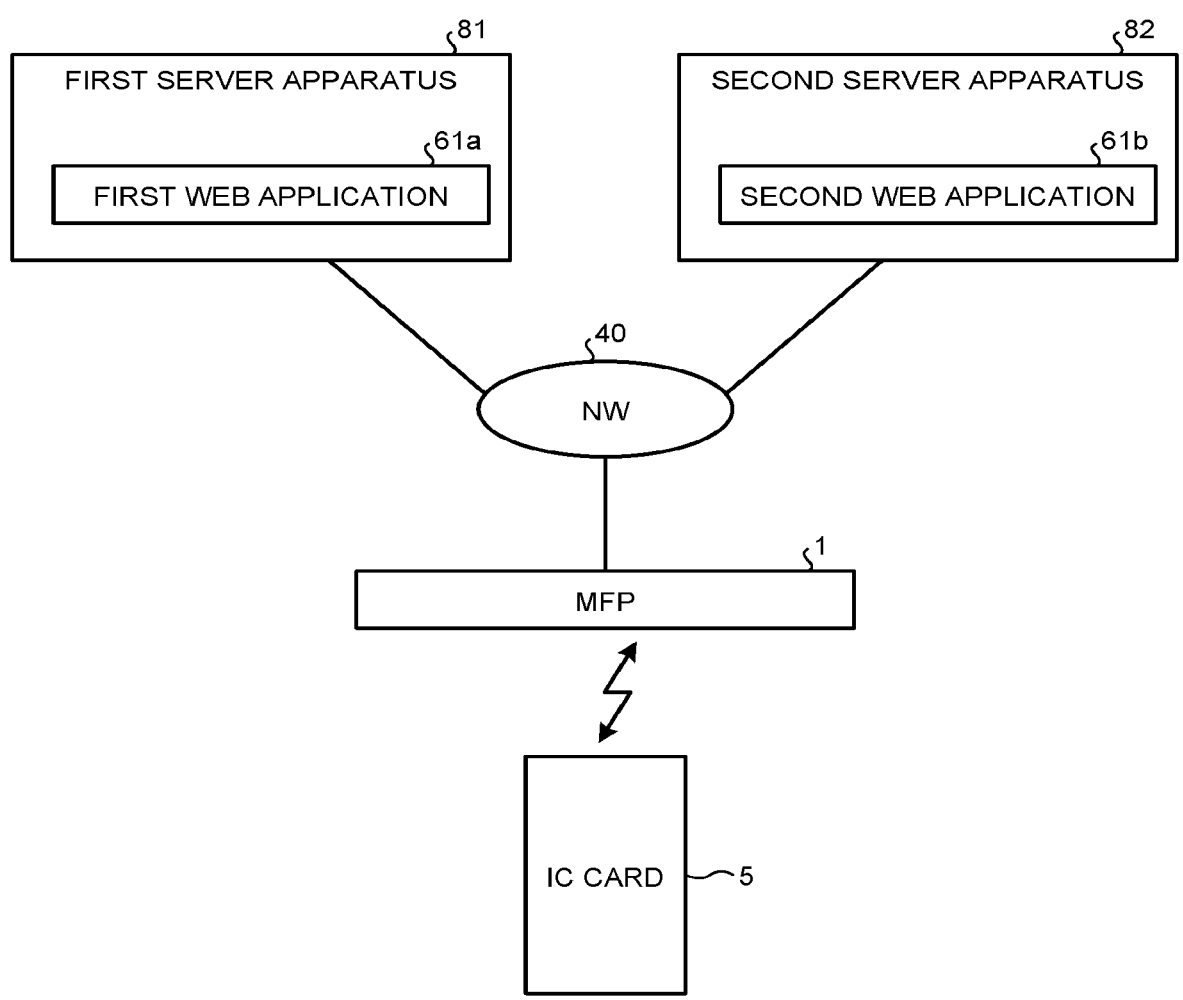

AUTHENTICATION PROCESSING APPARATUS, METHOD, AND COMPUTER PROGRAM PRODUCT FOR AUTHENTICATING A USER

CROSS-REFERENCE TO RELATED APPLICATIONS

The present application claims priority under 35 U.S.C. § 119 to Japanese Patent Application No. 2015-207868, filed Oct. 22, 2015 and Japanese Patent Application No. 2016-113708, filed Jun. 7, 2016. The contents of which are incorporated herein by reference in their entirety.

BACKGROUND OF THE INVENTION

1. Field of the Invention

The present invention relates generally to equipment, an authentication processing method, and a computer program product.

2. Description of the Related Art

In recent years, there is known an image forming apparatus that has a user authentication function. The authentication function is used to limit a function available to a user or to manage a usage status, for example. The authentication function is also used to cause the image forming apparatus to operate in cooperation with a personal computer device, a device other than a personal computer device, an application program (hereinafter, "application"), or the like. Hereinafter, authentication performed when starting using an image forming apparatus is referred to as "main body authentication".

Main body authentication is generally performed using a character string, such as a user ID (identification) and a password, as user identification information. Alternatively, an authentication process may be performed as follows. An IC card is issued to a user or a group. Authentication is performed by using a unique identification number granted to the IC card as user identification information. This scheme eliminates the trouble of entering the character string each time the image forming apparatus is used. A scheme of retrieving the user identification information by associating the identification number unique to the IC card with the user identification information to use the retrieved information in the authentication process is also known. Hereinafter, this authentication process using an IC card is referred to as "IC card authentication process". This scheme allows the image forming apparatus to acquire the user identification information only by bringing, by a user, the IC card in proximity of a card reader. For this reason, this scheme can facilitate the procedure for the authentication process.

A situation where the authentication process using an IC card is requested is not limited to the main body authentication; the authentication process can be requested by a started application. In this case, a user has to perform an operation of causing the IC card to be read again. Because the user is required to perform the IC card reading operation not only at the main body authentication but also after the main body authentication, operability of the image forming apparatus degrades.

SUMMARY OF THE INVENTION

According to an aspect of the present invention, there is provided Equipment including: a user authentication unit configured to perform a user authentication process based on authentication information stored in a storage medium; a usage registration unit configured to register a request for using the authentication information, the request being transmitted from an application; a storage controller configured to store the authentication information acquired from the storage medium in a storage unit; and a notifier configured to send the authentication information stored in the storage unit to the application, regarding which the request is registered.

According to another aspect of the present invention, there is provided an authentication processing method including: performing a user authentication process based on authentication information stored in a storage medium; registering a request for using the authentication information, the request being transmitted from an application; storing the authentication information acquired from the storage medium in a storage unit; and sending the authentication information stored in the storage unit to the application, regarding which the request is registered.

According to another aspect of the present invention, there is provided a computer program product for being executed on a computer including: a user authentication unit configured to perform a user authentication process based on authentication information stored in a storage medium; a usage registration unit configured to register a request for using the authentication information, the request being transmitted from an application; a storage controller configured to store the authentication information acquired from the storage medium in a storage unit; and a notifier configured to send the authentication information stored in the storage unit to the application, regarding which the request is registered.

BRIEF DESCRIPTION OF THE DRAWINGS

FIG. 11 is a sequence diagram of operations, in which the web browser acquires the card ID of the IC card and sends the card ID to a web application; and FIG. 12 is a system configuration diagram of an authentication system of a third embodiment.

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
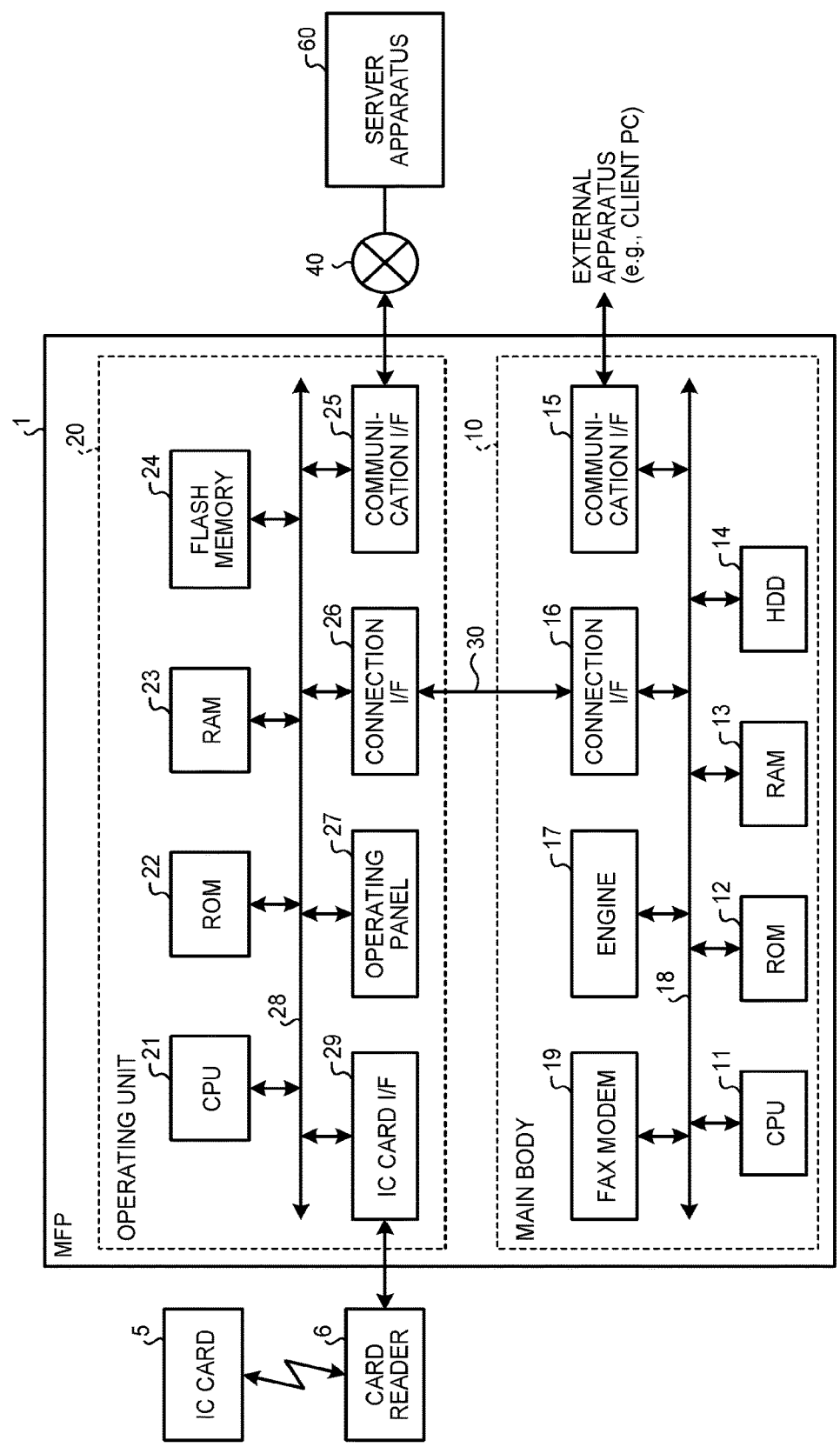
FIG. 1 is a hardware configuration diagram of an MFP of a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

The present invention has an object to provide equipment, an authentication processing method, and a computer program product capable of increasing operability.

First Embodiment

FIG. 1 is a hardware configuration diagram of an MFP (Multifunction Peripheral) 1 of a first embodiment. The MFP 1 is an example of "equipment" and "authentication system". As illustrated in FIG. 1, the MFP 1 includes a main body 10 having various types of functions, e.g., a copier function, a scanner function, a facsimile function, and a printer function, and an operating unit 20 for accepting an input that depends on a user's operation.

The main body 10 and the operating unit 20 are mutually communicably connected via a dedicated communication channel 30. A communication channel compliant with a desired standard, irrespective of wired or wireless, can be used as the communication channel 30; for example, a communication channel compliant with a USB (Universal Serial Bus) standard may be used. The main body 10 may have either one or a plurality of image generation functions, such as the copier function, the scanner function, the facsimile function, and the printer function.

As the operating unit 20, electronic equipment capable of executing information processing singly and completely can be used. For example, an information processing terminal, such as a smartphone and a tablet computer, can be used as the operating unit 20. Such an information processing terminal used as the operating unit 20 functions as an operating unit of the MFP 1.

More specifically, the information processing terminal used as the operating unit 20 is detachably and reattachably connected to the MFP 1 to take a place of a conventional operating panel that is mounted on and fixed to the MFP 1 as an operating unit for dedicated use for the MFP 1. Specifically, the information processing terminal used as the operating unit 20 may be mounted on the MFP 1 integrally but detachably (separably) at a predetermined position, which may be the position where the operating panel of the MFP 1 is to be arranged, for example. Accordingly, the set of the information processing terminal used as the operating unit 20 and the MFP 1 may be regarded as a single apparatus. When detached from the MFP 1, the information processing terminal, which is the operating unit 20, functions as the operating unit of the MFP 1 by performing wireless communication, e.g., Bluetooth (registered trademark) or infrared-ray communication, with the MFP 1.

The main body 10 operates in accordance with an input accepted by the operating unit 20. Furthermore, the main body 10 can perform communication also with an external apparatus, such as a client PC (personal computer), and operates in accordance with an instruction received from the external apparatus.

Hardware Configuration of Main Body

A hardware configuration of the main body 10 is described below. As illustrated in FIG. 1, the main body 10 includes a CPU 11, a ROM 12, a RAM 13, and an HDD (hard disk drive) 14. The main body 10 further includes a communication I/F (interface) 15, a connection I/F 16, an engine 17, and a facsimile modem (FAX modem) 19. The elements 11 to 17 and the FAX modem 19 are mutually connected via a system bus 18.

The CPU 11 performs centralized control of operations of the main body 10. The CPU 11 executes program instructions (hereinafter, "program") stored in the ROM 12, the HDD 14, or the like by using the RAM 13 as a work area, thereby controlling operations of the entire main body 10 and implementing various types of functions including the copier function, the scanner function, the facsimile function, and the printer function described above. A flash memory may be used in lieu of the HDD 14 of the main body 10.

The communication I/F 15 is an interface for communication with an external apparatus, such as a client PC, a web server apparatus, and an authentication server apparatus, on a network 40. The connection I/F 16 is an interface for communication with the operating unit 20 via the communication channel 30. Although the communication channel 30 is illustrated as a wired one in FIG. 1 and FIG. 2, as described above, the operating unit 20 is detachable from and reattachable to the main body 10 of the MFP 1. Accordingly, with the operating unit 20 attached to the MFP 1, the communication channel 30 functions as a wired communication channel, whereas with the operating unit 20 detached from the MFP 1, the communication channel 30 functions as a wireless communication channel.

The engine 17 is hardware that performs processing other than general-purpose information processing and communication processing for implementing the copier function, the scanner function, the facsimile function, the printer function, and the like. For example, the engine 17 includes a scanner that reads an image of an original document by scanning, a plotter that performs printing on a sheet material, such as paper, and a facsimile communication unit that performs facsimile communication. The engine 17 may further include a certain option(s), such as a finisher that sorts out printed sheets of the sheet material and an ADF (automatic document feeder) that automatically feeds an original document.

Although the description below is given through an example of user authentication using an IC card, an information terminal of various types, such as a smartphone and a cellular phone, having a function (or having an application installed thereon) for use in user authentication can be used as an authentication device. Such an authentication device can also implement functions similar to those implemented with use of an IC card, which will be described later. The embodiments are described on an assumption that an "IC card" is used in user authentication. However, the storage medium used in user authentication is not limited to an IC card, an ID card, or the like, and any storage medium where user information can be stored can be used.

Hardware Configuration of Operating Unit

A hardware configuration of the operating unit 20 is described below. As illustrated in FIG. 1, the operating unit 20 includes a CPU 21, a ROM 22, a RAM 23, a flash memory 24, a communication I/F 25, a connection I/F 26, an operating panel 27, and an IC card I/F 29, which are mutually connected via a system bus 28. An HDD may be used in lieu of the flash memory 24 of the operating unit 20.

The CPU 21 performs centralized control of operations of the operating unit 20. The CPU 21 controls operations of the entire operating unit 20 by executing programs stored in the ROM 22 or the like by using the RAM 23 as a work area. The CPU 21, which is an example of "user authentication unit", executes a user authentication program, thereby performing a user authentication process. The communication I/F 25 is an interface for communication with, for example, a server apparatus 60 on the network 40. The connection I/F 26 is an interface for communication with the main body 10 via the communication channel 30.

The IC card I/F 29 is connected to a card reader 6 via a USB cable, for example. In a login operation to the MFP 1 performed, the card reader 6 performs wireless contactless communication with an IC card 5 that is brought in proximity of the card reader 6 (by a contactless operation) by a user, thereby reading authentication information, such as a card ID and user information, stored in the IC card 5. The authentication information may alternatively be read from the IC card 5 by a contact operation rather than by the contactless operation.

The description below is given through an example where the card reader 6 and the operating unit 20, which are physically independent devices, are connected via a USB cable or the like. Alternatively, the card reader 6 may be built in the operating unit 20. Put another way, the card reader 6 and the operating unit 20 may be integrated (formed as a single device).

The present invention is applicable to any storage medium, which may be referred to as an IC card or an ID card, for example, and application of the present invention is not limited to an IC card, an ID card, or the like. The same goes for a card reader; any device capable of reading user information from such a storage medium can be used as the card reader.

The operating panel 27 may preferably be embodied in an LCD (liquid crystal display) having a touch sensor. The operating panel 27 accepts an input of various types that depend on a user's operation and displays various types of information, e.g., information that depends on the accepted input, information indicating an operational status of the MFP 1, and information indicating current settings. The operating panel 27 may alternatively be embodied in an organic EL (electroluminescent) display device including a touch sensor. The operating panel 27 may further include an operating part, such as a hardware key, and an indicator, such as a light-emitting element.

Software Configuration of MFP

Figure 2:
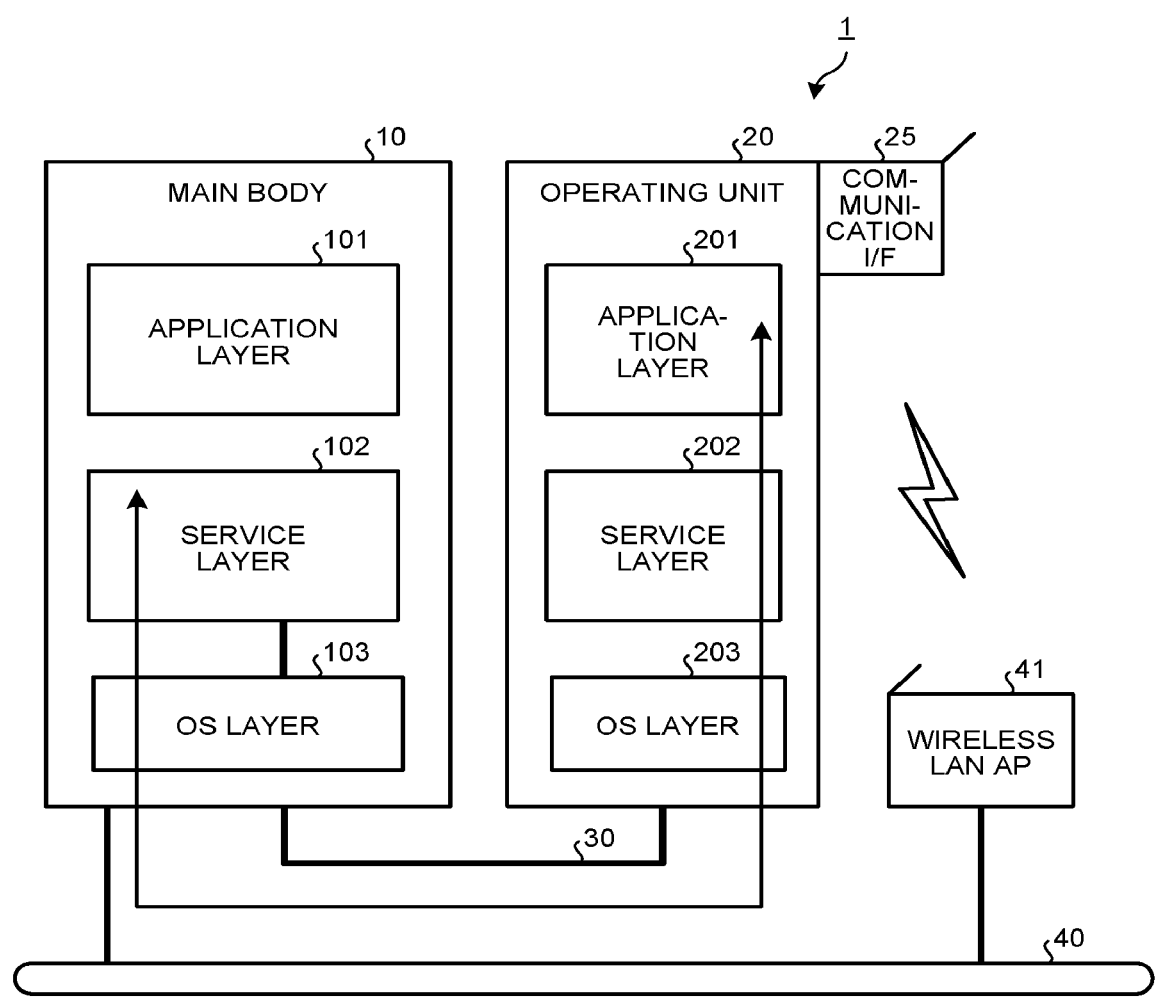
FIG. 2 is a software configuration diagram of the MFP of the first embodiment.

FIG. 2 illustrates an example of a software configuration of the MFP 1. As illustrated in FIG. 2, the main body 10 includes an application layer 101, a service layer 102, and an OS layer 103. The application layer 101, the service layer 102, and the OS layer 103 are embodied by various types of software stored in the ROM 12, the HDD 14, or the like. Various functions are provided by the CPU 11 by executing the software.

Software of the application layer 101 is application software (hereinafter, sometimes simplified as "application") for providing predetermined functions by utilizing hardware resources. Examples of the application include a copier application that provides the copier function, a scanner application that provides the scanner function, a facsimile application that provides the facsimile function, and a printer application that provides the printer function.

Software of the service layer 102 sits between the application layer 101 and the OS layer 103 and provides an interface that allows applications to utilize hardware resources included in the main body 10. Specifically, the software of the service layer 102 is software for providing a function of accepting operation requests requesting to utilize the hardware resources and arbitrating the operation requests. Examples of the operation requests that may be accepted by the service layer 102 include a request requesting for reading using the scanner and a request requesting for printing using the plotter.

The service layer 102 provides the interface function not only to the application layer 101 of the main body 10 but also to an application layer 201 of the operating unit 20. Specifically, the application layer 201 (application) of the operating unit 20 can implement functions utilizing the hardware resources (e.g., the engine 17) of the main body 10 via the interface function provided by the service layer 102.

Software of the OS layer 103 is basic software (operating system) providing basic functions for controlling hardware included in the main body 10. The software of the service layer 102 converts a request for using hardware resources issued from an application, which may be of various types, into a command interpretable by the OS layer 103 and passes the command to the OS layer 103. The software of the OS layer 103 executes the command, thereby operating the hardware resources as requested by the application.

Similarly, the operating unit 20 includes the application layer 201, a service layer 202, and an OS layer 203. The application layer 201, the service layer 202, and the OS layer 203 included in the operating unit 20 are similar to those of the main body 10 in hierarchal architecture. It should be noted that functions provided by applications of the application layer 201 and types of operation requests acceptable by the service layer 202 differ from those of the main body 10. The applications of the application layer 201 are software for providing predetermined functions by operating the hardware resources included in the operating unit 20. The applications of the application layer 201 are mainly software for providing UI (user interface) functions for performing operations and providing display related to the functions (the copier function, the scanner function, the facsimile function, and the printer function) the main body 10 has.

In the example of the embodiment, the software of the OS layer 103 of the main body 10 and software of the OS layer 203 of the operating unit 20 differ from each other to maintain functional independence. Put another way, the main body 10 and the operating unit 20 operate on separate operating systems independently of each other. For example, Linux (registered trademark) may be used as the software of the OS layer 103 of the main body 10, whereas Android (registered trademark) is used as the software of the OS layer 203 of the operating unit 20.

When the main body 10 and the operating unit 20 operate on separate operating systems, communication between the main body 10 and the operating unit 20 is performed as communication between different devices rather than communication between processes within a same device. Examples of such communication include an operation (command communication) of transmitting an input (an instruction given from a user) accepted by the operating unit 20 to the main body 10 and an operation of sending a notification of an event from the main body 10 to the operating unit 20. In this example, by performing the command communication to the main body 10, the operating unit 20 can use the functions of the main body 10. Examples of the event, notification of which is sent from the main body 10 to the operating unit 20, include an operation execution status on the main body 10 and settings configured on the main body 10.

In the example of the embodiment, because electric power from the main body 10 to the operating unit 20 is supplied via the communication channel 30, power supply control of the operating unit 20 can be performed separately from (independently of) power supply control of the main body 10.

In this example, the main body 10 and the operating unit 20 are electrically and physically connected via the communication channel 30; however, the operating unit 20 can be detached from the main body 10 as described above. In this case, each of the main body 10 and the operating unit 20 may preferably include a near-field wireless communication unit, such as an infrared-ray communication unit, an RF communication unit, and a Bluetooth (registered trademark) communication unit. RF is an abbreviation for "Radio Frequency". Alternatively, mutual communication may be enabled via a wireless LAN access point (wireless LAN AP) 41 and the network 40 as illustrated in FIG. 2 by configuring each of the main body 10 and the operating unit 20 to have a wireless LAN communication function based on, e.g., Wi-Fi (registered trademark) technology. LAN is an abbreviation for "Local Area Network". When the operating unit 20 is detachable from the main body 10, it may be preferable that the operating unit 20 accumulates electric power supplied from the main body 10 via the communication channel 30 in a secondary battery and, when the operating unit 20 is detached from the main body 10, the operating unit 20 operates on the electric power accumulated in the secondary battery to perform communication with the main body 10.

Figure 3:
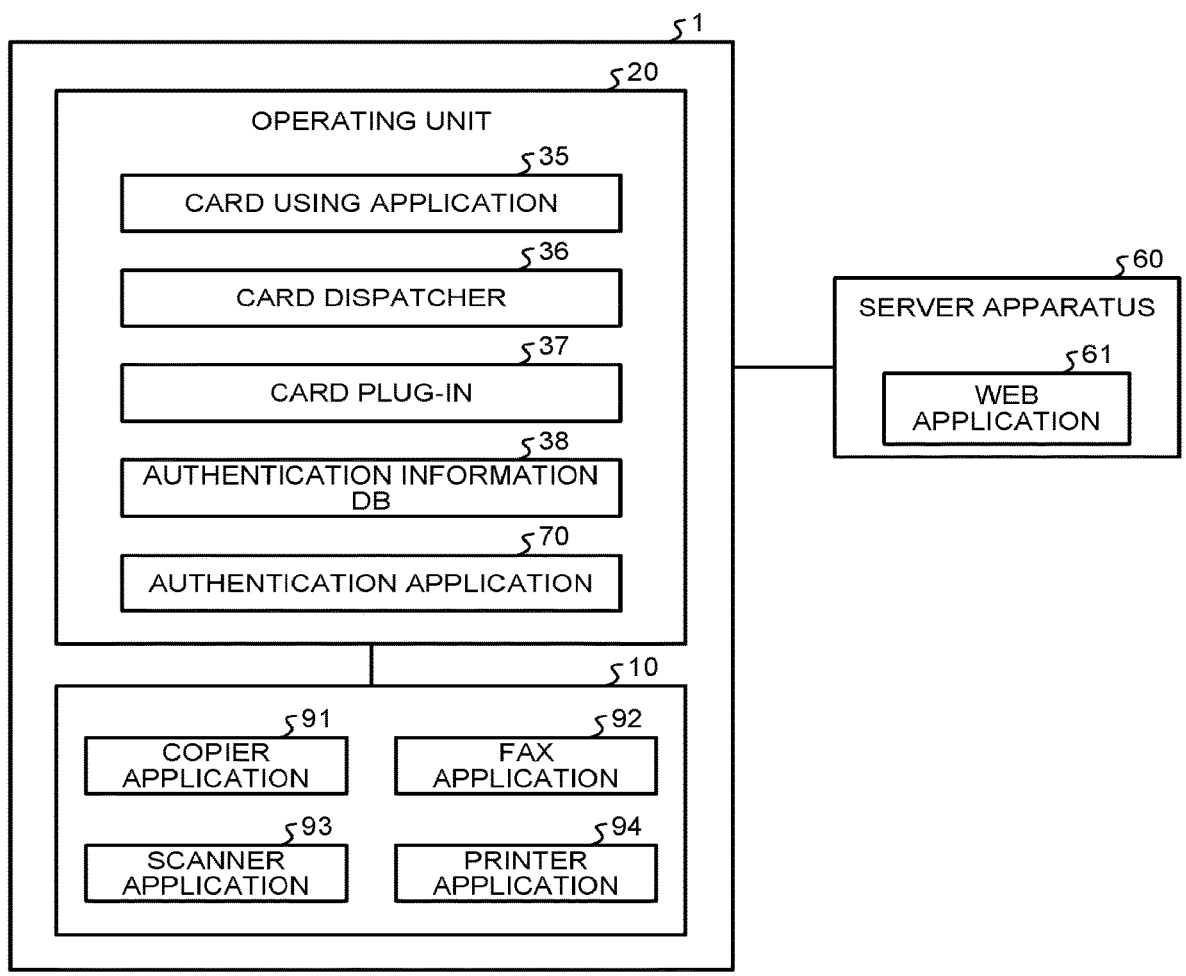
FIG. 3 is a diagram illustrating software contained in the MFP and a server apparatus of the first embodiment.

FIG. 3 is a diagram illustrating software contained in the MFP 1 and the server apparatus 60. As illustrated in FIG. 3, the main body 10 of the MFP 1 includes a copier application 91, a FAX application 92, a scanner application 93, and a printer application 94. Each of the applications 91 to 94 is stored in a storage unit, such as the ROM 12, the RAM 13, or the HDD 14. The CPU 11 of the main body 10 reads out one of the applications 91 to 94 from the storage unit, loads it into the RAM 13 or the like, and executes it, thereby executing and controlling a printing operation or a scanning operation via the engine 17.

A card using application program (card using application) 35 that requires authentication information, such as unique identification information (the card ID) uniquely granted to the IC card 5, at startup or when a predetermined process is performed is stored in the operating unit 20 of the MFP 1. An IC-card-usage management application program (card dispatcher) 36 for usage management of the IC card 5 is also stored in the operating unit 20.

A card plug-in 37, which is an application program that processes detection of the IC card 5 and controls access to the IC card 5, is also stored in the operating unit 20. An authentication information database (authentication information DB) 38, which is an example of "authentication-information storage unit" where a card ID and user information of each of IC cards, which are associated with each other, are stored, and an authentication application program (authentication application) 70 for performing a user authentication process for users of the MFP 1 are also stored in the operating unit 20.

The card using application 35, the card dispatcher 36, the card plug-in 37, the authentication information DB 38, and the authentication application 70 are stored in a storage unit, such as the ROM 22, the RAM 23, or the flash memory 24. Alternatively, they may be stored in a storage device connectable to the operating unit 20 via a network and downloaded by the operating unit 20. The CPU 21 of the operating unit 20 executes the card using application 35, the card dispatcher 36, the card plug-in 37, or the authentication application 70 by reading out it from the storage unit and loading it into the RAM 23 or the like.

A web application program (web application) 61 that provides a service to the MFP 1 is stored in the server apparatus 60 on the network 40. The web application 61 is stored in a storage unit, such as a ROM, a RAM, and an HDD, on the server apparatus 60. Alternatively, the web application 61 may be stored in a storage device or the like connectable to the server apparatus 60 via a network and downloaded by the server apparatus 60.

Figure 4:
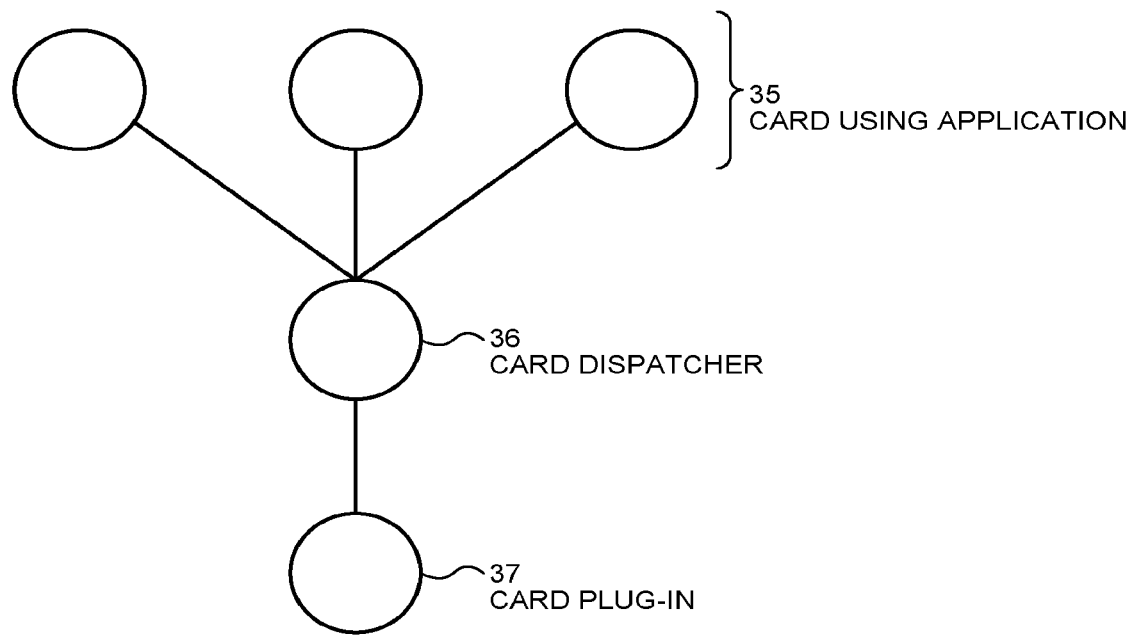
FIG. 4 is a diagram for describing functions of a card dispatcher.

FIG. 4 is a diagram for describing functions of the card dispatcher 36. The card dispatcher 30 provides the card plug-in 37 that performs detection of the IC card 5 and access to the IC card 5 with at least an API (Application Programming Interface) for "informing detected card". The card plug-in 37 performs the "informing detected card" of detecting, by accessing a USB host, that the IC card 5 is brought in proximity of the card reader 6 and sending at least the card ID of the IC card 5 to the card dispatcher 30. A plurality of the card plug-ins 37 may be provided in one-to-one correspondence with types of the IC cards 5.

The card dispatcher 36 provides the card using application 35 that utilizes the IC card 5 with an API for "card usage registration". A plurality of the card using applications 35 may be stored. The card dispatcher 36 mediates "informing detected card" to the card using application 35 when the "informing detected card" is performed by the card plug-in 37.

The card dispatcher 36 stores a card ID, which is unique identification information informed by the card plug-in 37 when the card plug-in 37 has performed the "informing detected card". The card dispatcher 36 also provides the card using application 35 with an API for acquiring a card ID detected most recently. The card dispatcher 36 may hold information (e.g., user information) other than the card ID.

The card dispatcher 36 may provide an information acquisition API for acquiring information other than the card ID. Furthermore, the card dispatcher 36 may impose restriction on information acquisition by using a PIN (Personal Identification Number) value as an essential parameter. This configuration allows even the card using application 35 that has registered usage of a card after the card is detected to acquire a card ID of the IC card 5 that is used most recently. The card ID stored by the card dispatcher 30 is erased by an erasing unit when the user logs out from the MFP 1 (leaves the state logged in the MFP 1) and enters a not-logged-in state. When a request for the card ID is issued from the card using application 35 after the card ID is erased, the card dispatcher 36 may preferably return error information or null information.

Figure 5:
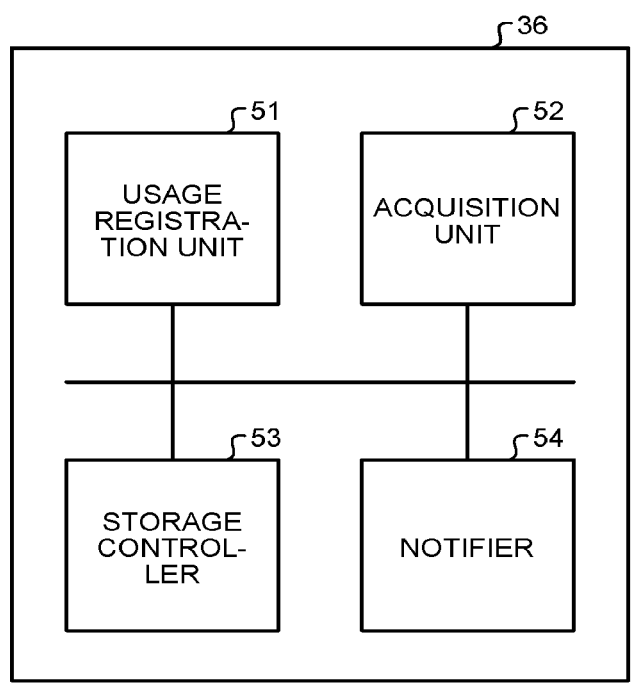
FIG. 5 is a functional block diagram of the card dispatcher.

FIG. 5 is a functional block diagram of the card dispatcher 36. The CPU 21 of the operating unit 20 implements functions of a usage registration unit 51, an acquisition unit 52, a storage controller 53, and a notifier 54 as illustrated in FIG. 5 by executing the card dispatcher 36. A part or all of the units 51 to 54 illustrated in FIG. 5 may be implemented in hardware.

The usage registration unit 51 registers usage of the IC card 5 by the card using application 35. The acquisition unit 52 acquires the card ID from the IC card 5. The storage controller 53 performs control to store the card ID read out from the IC card 5 in a storage unit, such as the RAM 23. The notifier 54 sends the card ID read out from the IC card 5 to the card using application 35.

Figure 6:
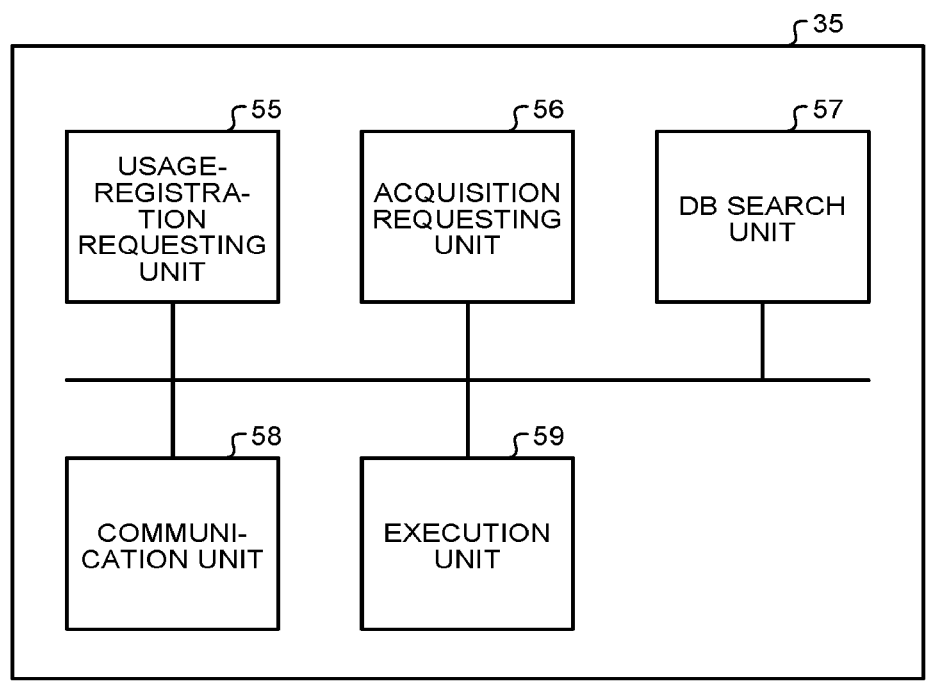
FIG. 6 is a functional block diagram of a card using application.

FIG. 6 is a functional block diagram of the card using application 35. The CPU 21 of the operating unit 20 implements functions of a usage-registration requesting unit 55, an acquisition requesting unit 56, a DB search unit 57, a communication unit 58, and an execution unit 59 as illustrated in FIG. 6 by executing the card using application 35. A part or all of the units 55 to 59 illustrated in FIG. 6 may be implemented in hardware.

The usage-registration requesting unit 55 registers usage of the card ID to the card dispatcher 36. The acquisition requesting unit 56 issues a request for the card ID to the card dispatcher 36. The DB search unit 57, which is an example of "search unit", searches the authentication information DB 38 based on the acquired ID to acquire login information for logging in to the server apparatus 60. The communication unit 58 transmits the login information to the server apparatus 60 via the network 40 and receives a result of a login attempt from the server apparatus 60. The execution unit 59 executes information processing that is enabled when logged in to the server apparatus 60.

Figure 7:
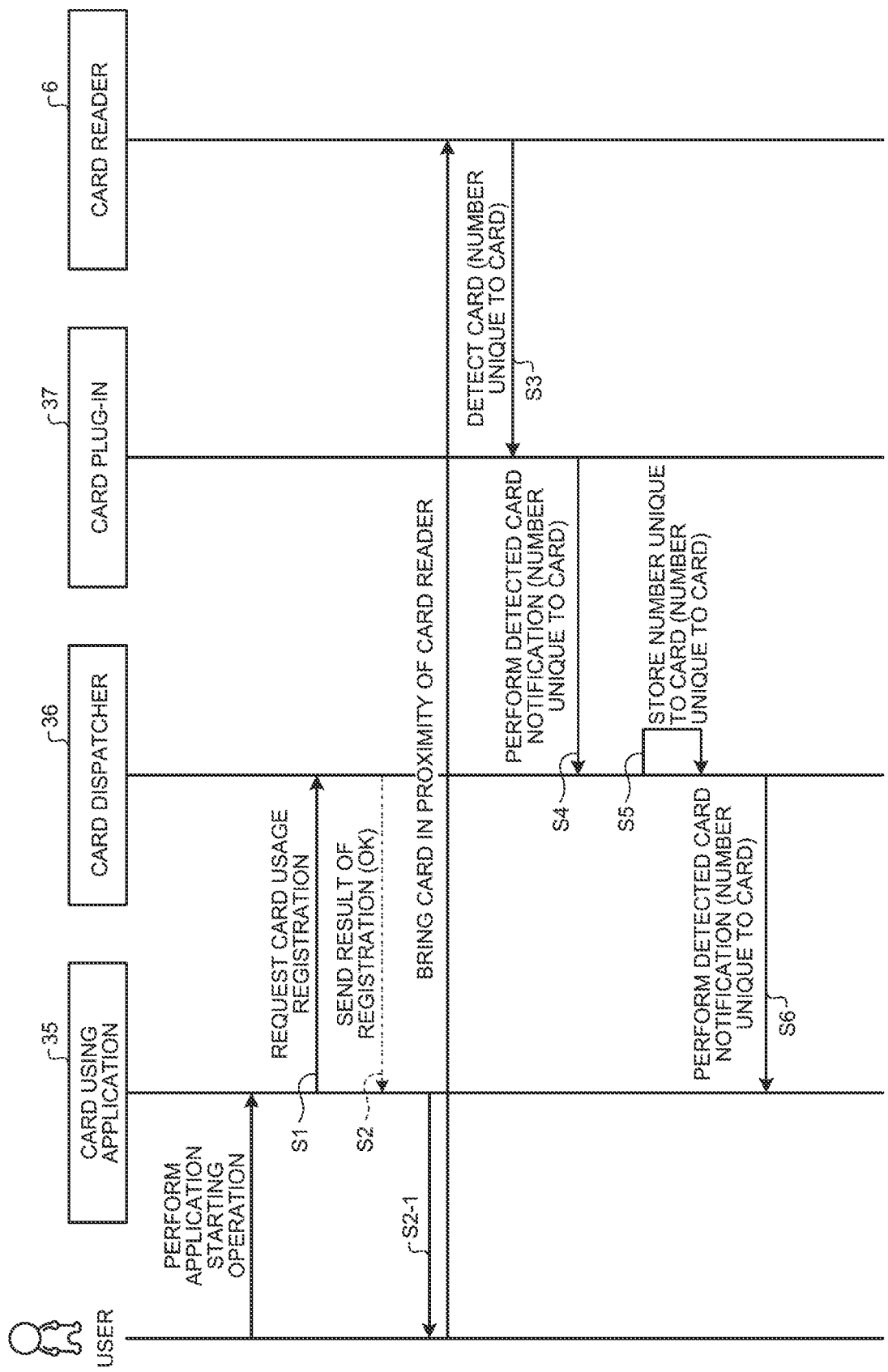
FIG. 7 is a sequence diagram of operations, in which the card dispatcher acquires a card ID of an IC card and sends the card ID to the card using application.

FIG. 7 illustrates a sequence diagram of operations, in which the card dispatcher 30 acquires the card ID of the IC card 5 and sends the card ID to the card using application 35. Settings of the MFP 1 can be configured so as to perform user authentication when the MFP 1 is used in order to prevent information leakage and reduce unintended printing. The user authentication process is performed by the CPU 21 of the operating unit 20 by using the authentication application 70. The user authentication process is a process (login process) of identifying a user of a function of the MFP 1 among users registered in the authentication information DB 38. Using the function of the MFP 1 is permitted only when the user is identified (in a logged-in state). The user authentication setting of the MFP 1 is set to "enabled" in advance.

When the user authentication setting is set to "enabled", the CPU 21 of the operating unit 20 stores information indicating whether or not any one of the registered users is in the logged-in state in a storage unit, such as the RAM 23. When the information indicates that no user is in the logged-in state, the CPU 21 starts the authentication application 70 for performing user authentication and performs the user authentication process.

When an operation to start a desired one of the card using applications 35 is performed via the operating panel 27 of the operating unit 20 by the thus-logged-in user, the usage-registration requesting unit 55 of the card using application 35 issues a request for registering usage of the IC card 5 to the card dispatcher 36 (S1). When permission for registration is given to the card using application 35 by the usage registration unit 51 of the card dispatcher 36 (S2), the card using application 35 displays, on the operating panel 27, a message, e.g., "please bring your card close to the reader", prompting a reading operation of causing the IC card 5 to be read (S2-1). In response thereto, the operator brings the IC card 5 in proximity of the card reader 6 (i.e., performs the reading operation).

When the IC card 5 is brought in proximity of the card reader 6, the card plug-in 37 detects it (S3). The card plug-in 37 sends the card ID read out from the IC card 5 to the card dispatcher 36 (S4). The acquisition unit 52 of the card dispatcher 36 acquires the sent card ID. The storage controller 53 of the card dispatcher 36 stores the acquired card ID in a storage unit, such as the RAM 23 (S5). The notifier 54 of the card dispatcher 36 sends the card ID to the card using application 35 (S6).

Hence, even in a case where the card using application 35 requires the card ID after login, the card dispatcher 36 can send the card ID to the card using application 35 as required. Therefore, even in a case where the card using application 35 requires the card ID after login, the user is not required to perform the reading operation of the IC card 5. Consequently, operability of an image forming apparatus can be increased.

The card dispatcher 36 may be configured to send the card ID to a corresponding one of the card using applications 35 only when the "informing detected card" is performed regarding the IC card 5 of a type designated by a type designating unit. This configuration enables shared use of the card detection function provided by the card plug-in 37 among the plurality of card using applications 35. Furthermore, this configuration allows, by replacing the card plug-in 37, modifying only the card detection function easily without altering the card using application 32. In this example, the card dispatcher 36 sends only the card ID to the card using application 35; alternatively, the card dispatcher 36 may send other information, such as user information, to the card using application 35.

The card dispatcher 36 erases the stored card ID when the user logs out from the MFP 1 (leaves the logged-in state) and enters the not-logged-in state. When a request for the card ID is issued from the card using application 35 after the card ID is erased, the card dispatcher 36 may preferably return error information or null information to the card using application 35.

Figure 8:
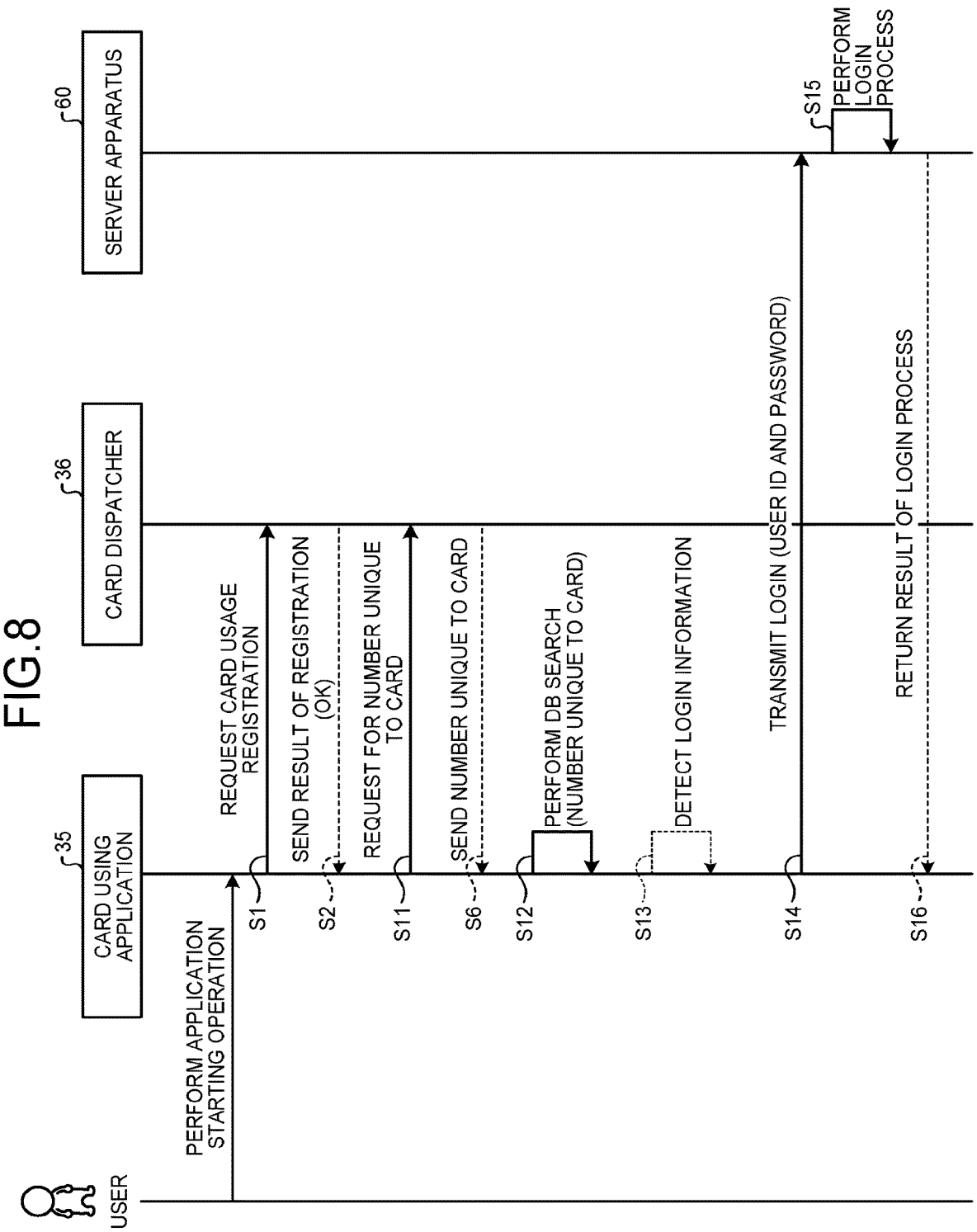
FIG. 8 is a sequence diagram illustrating a sequence of operations, in which the card using application logs in to the server apparatus on a network to provide a service provided by the server apparatus to a user via the card using application.

FIG. 8 is a sequence diagram illustrating a sequence of operations, in which the card using application 35 logs in to the server apparatus 60 on the network to provide a service provided by the server apparatus 60 to a user via the card using application 35.

To make the service provided by the server apparatus 60 available, an authentication process using a user ID and a password is required. The card using application 35 having a function to cooperate with the IC card 5 associates the card ID with the user ID and the password for the service provided by the server apparatus 60, encrypts them, and stores the encrypted IDs and the password, which are associated with each other, in the authentication information DB 38.

Referring to the sequence diagram of FIG. 8, when the card using application 35 is started by the user, the usage-registration requesting unit 55 of the card using application 35 issues a request for registering usage of the card to the card dispatcher 36 (S1). When permission for registration is given by the card dispatcher 36 (S2), the acquisition requesting unit 56 of the card using application 35 issues a request for the card ID (S11). As described above with reference to FIG. 7, the notifier 54 of the card dispatcher 36 sends the card ID acquired from the IC card 5 to the card using application 35 (S6).

If the user has performed user authentication using the IC card 5 when logging in to the MFP 1, the card ID acquired at S6 is the card ID of the IC card 5 used in the user authentication. To ensure that the IC card 5 is the one used at login, the card dispatcher 36 may provide an API for "registering card ID for use in user authentication". When such an API is provided, the card using application 35 may preferably register the card ID of the IC card 5 used in the user authentication using the provided API; the card dispatcher 36 may preferably send the registered card ID to the card using application 35.

Alternatively, the following configuration may be employed. When "informing detected card" is received by the card plug-in 37, the card dispatcher 36 determines whether transition of an authentication state of the MFP 1 has occurred between before and after the "informing detected card", and stores the card ID sent when transition from the not-logged-in state to the logged-in state has occurred as the card ID of the IC card 5 used in the user authentication.

Thereafter, the DB search unit 57 of the card using application 35 searches the authentication information DB 38 based on the sent card ID (S12). The card using application 35 detects the user ID and the password, which are login information for logging in to the server apparatus 60, stored as being associated with the sent card ID (S13). The communication unit 58 of the card using application 35 transmits the detected login information (the user ID and the password) to the server apparatus 60 via the network 40.

If the user ID and the password associated with the card ID are not found in the authentication information DB 38 by the search, the card using application 35 notifies the user of an error via the operating panel 27. Alternatively, a login screen for manually entering the user ID and the password may be displayed via the operating panel 27. Furthermore, a registration screen for associating the card ID with the user ID and the password, with which the login attempt has failed, again may be displayed via the operating panel 27.

The server apparatus 60 performs a login process based on the received login information (S15) and returns a result of the login process to the card using application 35 (S16). When the login process ends normally, the user can use the service provided by the server apparatus 60 via the card using application 35. Information processing corresponding to the service provided by the server apparatus 60 is executed by the execution unit 59 of the card using application 35.

In this example, it is desirable that the user completes the process of associating the card ID of the IC card 5 used in user authentication with the login information for making the service provided by the server apparatus 60 available in advance, so that even when the card using application 35 and the user ID of the user and the password managed by the card using application 35 are different, automatic login to the server apparatus 60 can be achieved by performing, only once, the card reading operation for user authentication at login to the MFP 1.

As is apparent from the description given above, in the MFP 1 of the first embodiment, the card dispatcher 36 stores the card ID acquired from the IC card 5 at login to the MFP 1 (i.e., at user authentication). The card dispatcher 36 provides the stored card ID as requested by the card using application 35.

Hence, even in a case where the card using application 35 requires the card ID after login, the card dispatcher 36 can send the card ID to the card using application 35 as required. Therefore, even in a case where the card using application 35 requires the card ID after login, a user is not required to perform the reading operation of the IC card 5. Consequently, operability of the image forming apparatus can be increased.

Second Embodiment

An authentication system of a second embodiment is described below. In the first embodiment described above, the card dispatcher 36 stores and sends the card ID. By contrast, in the second embodiment, a web browser stores and sends the card ID. The second embodiment described below differs from the first embodiment described above only in this respect. Therefore, only what makes the second embodiment different from the first embodiment is described below, and repeated description is omitted.

Figure 9:
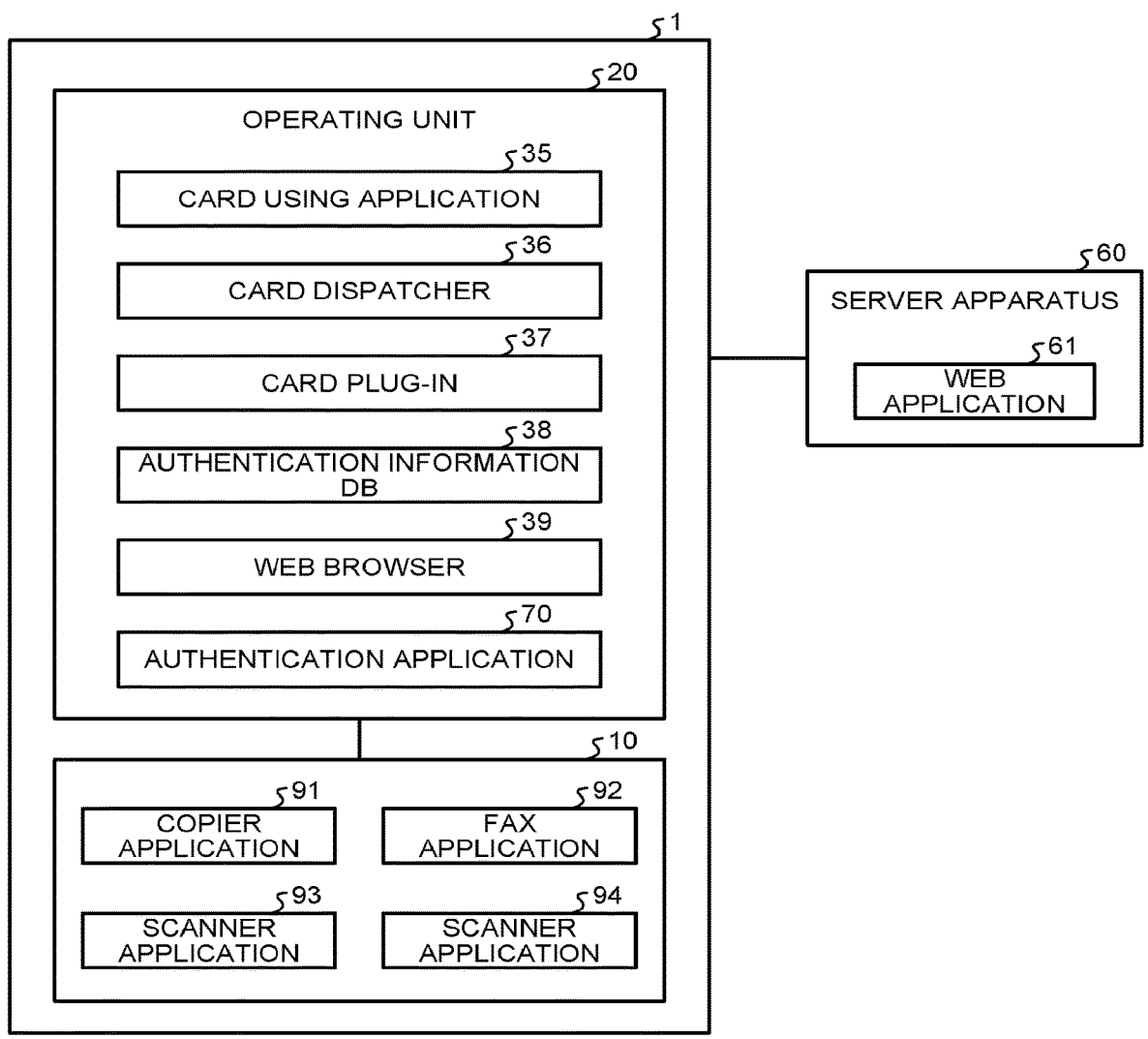
FIG. 9 is a diagram illustrating software contained in the MFP and the server apparatus included in an authentication system of a second embodiment.

FIG. 9 is a diagram illustrating software respectively contained in the MFP 1 and the server apparatus 60 included in the authentication system of the second embodiment. In the authentication system of the second embodiment, the operating unit 20 on the MFP 1 includes a web browser 39 in addition to the card using application 35, the card dispatcher 36, the card plug-in 37, the authentication information DB 38, and the authentication application 70 described above. The web browser 39 may be stored in the ROM 22, the RAM 23, a storage unit on the network, or the like as are the elements 35 to 38 and 70. The server apparatus 60 on the network 40 includes the web application program (web application) 61 that provides a service to the MFP 1.

Figure 10:
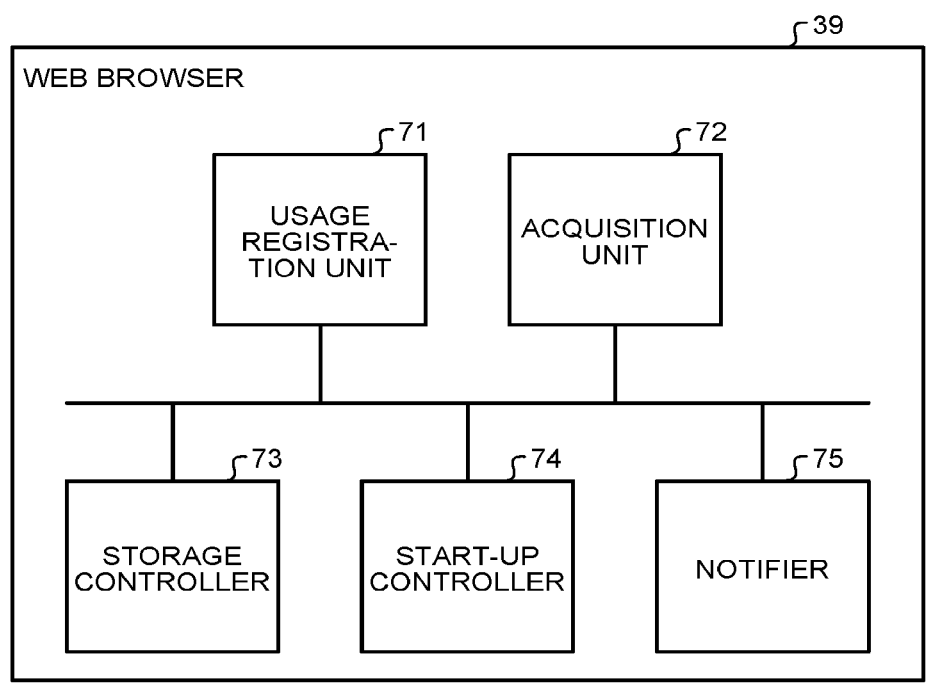
FIG. 10 is a functional block diagram of a web browser.

FIG. 10 is a functional block diagram of the web browser 39. The CPU 21 of the operating unit 20 implements functions of the web browser 39 illustrated in FIG. 10 by executing a web browsing application program stored in the ROM 22. Specifically, the web browser 39 has functions of a usage registration unit 71, an acquisition unit 72, a storage controller 73, a start-up controller 74, and a notifier 75. A part or all of the units 71 to 75 illustrated in FIG. 10 may be implemented in hardware.

The usage registration unit 71 registers usage of the IC card 5 by the web browser 39. The acquisition unit 72 acquires the card ID from the IC card 5. The storage controller 73 performs control to store the card ID read out from the IC card 5 in a storage unit, e.g., the RAM 23. The start-up controller 74 performs control to start the web application 61 on the server apparatus 60 via the network. The notifier 75 sends the card ID read out from the IC card 5 to the start-up controller 74.

FIG. 11 is a sequence diagram of operations, in which the web browser 39 acquires the card ID of the IC card 5 and sends the card ID to the web application 61. When an operation to start up the MFP 1 is performed by a user, the usage registration unit 71 of the web browser 39 issues a request to register usage of the IC card 5 to the card dispatcher 36 (S21). When permission for registration is given to the web browser 39 by the usage registration unit 51 of the card dispatcher 36 (S22), the web browser 39 displays, on the operating panel 27, a message, e.g., "please bring your card close to the reader", prompting the reading operation of causing the IC card 5 to be read (S22-1). In response thereto, the operator brings the IC card 5 in proximity of the card reader 6 (i.e., performs the reading operation) (S23).

When the IC card 5 is brought in proximity of the card reader 6, the card plug-in 37 detects it (S24). The card plug-in 37 sends the card ID read out from the IC card 5 to the card dispatcher 36 (S25). The acquisition unit 52 of the card dispatcher 36 transfers the sent card ID to the web browser 39 (S26).

The acquisition unit 72 of the web browser 39 acquires the transferred card ID. The storage controller 73 of the web browser 39 stores the sent card ID in a storage unit, such as the RAM 23 (S27).

Thereafter, when an operation to start the web application 61 on the server apparatus 60 is performed by the user, the start-up controller 74 of the web browser 39 issues a start request requesting to start the web application 61 to the server apparatus 60 (S28). Upon receiving the start request, the web application 61 issues a card ID request to the web browser 39 (S29). In response to the card ID request received from the web application 61, the notifier 75 of the web browser 39 sends the stored card ID to the web application 61 (S30).

In this example, the server apparatus 61 includes the authentication information DB 38 where the card ID, the user ID, and the password that are associated with each other are stored. The web application 61 retrieves the user ID and the password associated with the card ID sent from the web browser 39 by searching the authentication information DB 38 based on the card ID. The web application 61 performs user authentication using the retrieved user ID and password. If the user is authenticated as an authorized user, a login process for the web application 61 is performed at S31. At S32, the web application 61 sends a result of the login process to the web browser 39. Hence, the user can use the service provided by the web application 61 via the web browser 39.

In this example, the authentication information DB 38 is included on the side of the web application 61; and the web application 61 retrieves the user ID and the password based on the card ID. Alternatively, the following configuration may be employed as in the first embodiment described above. The web browser 39 retrieves, based on the card ID, the user ID and the password from the authentication information DB 38 that is held on the side of the web browser 39 and transmits the retrieved user ID and password to the web application 61 on the server apparatus 60. With this configuration, the web application 61 may preferably perform the login process by searching a database where user IDs and passwords are stored based on the user ID and the password received from the web browser 39, and transmit a result of the login process to the web browser 39.

In the authentication system of the second embodiment configured as described above, the web browser 39 can provide the function of storing a card ID, the function of sending the card ID to the web application 61 or the like, and the like. Accordingly, not only some of a load placed on the card dispatcher 36 can be taken off but also an advantage similar to that provided by the first embodiment can be obtained.

Third Embodiment

An authentication system of a third embodiment is described below. In the authentication system of the third embodiment, the login process is shared among a plurality of server apparatuses on a network.

FIG. 12 illustrates a system configuration of the authentication system of the third embodiment. As illustrated in FIG. 12, in the authentication system of the third embodiment, a first server apparatus 81 and a second server apparatus 82 are arranged on the network 40. Although FIG. 12 illustrates an example where the authentication system includes the two server apparatuses (81 and 82), the authentication system may include three or more server apparatuses.

A first web application 61a, and the authentication information DB 38 where a card ID, a user ID, and a password that are associated with each other are stored are stored in the first server apparatus 81. A second web application 61b, and an authentication database where the user ID and the password that are associated with each other are stored are stored in the second server apparatus 82.

In the authentication system of the third embodiment configured as described above, when the web browser 39 on the MFP 1 acquires a card ID, the web browser 39 transmits the card ID to the first server apparatus 81 via the network 40. The first web application 61a on the first server apparatus 81 detects the user ID and the password associated with the card ID received from the web browser 39 by searching the authentication information DB 38 based on the received card ID, and transmits the user ID and the password to the second server apparatus 82 via the network 40.

The second web application 61b on the second server apparatus 82 performs a login process by accessing the authentication database based on the user ID and the password received from the first server apparatus 81. The second web application 61b transmits a result of the login process to the first server apparatus 81 and the web browser 39 on the MFP 1. When the obtained result of the login process indicates that the login process succeeded, the user can use a service(s) provided by the first web application 61a and the second web application 61b via the web browser 39.

In the authentication system of the third embodiment configured as described above, the login process is shared between the first server apparatus 81 and the second server apparatus 82. Accordingly, not only some of a load placed on the MFP 1 can be taken off but also an advantage similar to that provided by each of the first and second embodiments can be obtained.

For example, in the description of the first to third embodiments, the present invention is applied to the MFP 1 where the operating unit 20 is detachable from and reattachable to the main body 10. Even when the present invention is applied to equipment, such as an MFP where an operating unit is fixed to a main body, an advantage similar to that described above can be obtained.

The MFP 1 of each of the embodiments is an example of equipment, to which the present invention is applied. The present invention is applicable to any equipment, such as a projector apparatus, a video conference system, and a digital camera apparatus, so long as the equipment has various types of functions and performs user authentication.

It should be noted that a person skilled in the field of information processing technology may employ the present invention using application specific integrated circuits (ASIC) or an apparatus in which circuit modules are connected.

Further, each of functions (units) may be implemented by one or more circuits.

It should be noted that, in the specification, the circuit may include a processor programmed by software to execute the corresponding functions and hardware which is designed to execute the corresponding functions such as the ACIC and the circuit module.

According to an aspect of the present embodiments, operability of equipment can be advantageously increased.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An image processing apparatus comprising:
a user authentication unit implemented by circuitry and configured to perform a main body authentication process based on IC card identification information stored in each of a plurality of types of IC card;
a usage registration unit implemented by the circuitry and configured to register a request for using the IC card identification information, the request being transmitted from an application;
a storage controller implemented by the circuitry and configured to store the IC card identification information acquired from each of the plurality of types of IC card in a memory;
a notifier implemented by the circuitry and configured to send the IC card identification information stored in the memory to the application, regarding which the request is registered; and
a type designating unit implemented by the circuitry and configured to designate a type of the IC card corresponding to a card plug-in application within the user authentication unit, wherein
the notifier sends, to the application, IC card identification information of the IC card in response to a type of the IC card being the same as the designated type.

2. The image processing apparatus according to claim 1, wherein the memory is configured to store the IC card identification information and login information for use in logging in to a server apparatus on a network, the IC card identification information and the login information being associated with each other;
a search unit implemented by the circuitry and configured to retrieve, from the memory, the login information associated with the IC card identification information acquired from the IC card; and
a communication unit implemented by the circuitry and configured to transmit the retrieved login information to the server apparatus via the network, wherein
the application is operated using a result of a login attempt made using the login information, the result being sent from the server apparatus.

3. An authentication processing method comprising:
performing a main body authentication process based on IC card identification information stored in each of a plurality of types of IC card;
registering a request for using the IC card identification information, the request being transmitted from an application;
storing the IC card identification information acquired from each of the plurality of types of IC card in a memory;
sending the IC card identification information stored in the memory to the application, regarding which the request is registered;
designating a type of the IC card corresponding to a card plug-in application within the user authentication unit; and
sending, to the application, IC card identification information of the IC card in response to a type of the IC card being the same as the designated type.

4. The authentication processing method according to claim 3, further comprising:
retrieving, from the memory, the IC card identification information and login information, the login information being for use in logging in to a server apparatus on a network and associated with the IC card identification information acquired from the IC card; and
transmitting the retrieved login information to the server apparatus via the network, wherein
the application is operated using a result of a login attempt made using the login information, the result being sent from the server apparatus.

5. A non-transitory computer-readable medium encoded with computer-readable instructions thereon that, when executed by a computer, cause the computer to perform a method comprising:
performing a main body authentication process based on IC card identification information stored in each of a plurality of types of IC card;
registering a request for using the IC card identification information, the request being transmitted from an application;
storing the IC card identification information acquired from each of the plurality of types of IC card in a memory;
sending the IC card identification information stored in the memory to the application, regarding which the request is registered;
designating a type of the IC card corresponding to a card plug-in application within the user authentication unit; and sending, to the application, IC card identification information of the IC card in response to a type of the IC card being the same as the designated type.

6. The non-transitory computer-readable medium according to claim 5, further comprising:

retrieving, from the memory, the IC card identification information and login information, the login information being for use in logging in to a server apparatus on a network and associated with the IC card identification information acquired from the IC card; and transmitting the retrieved login information to the server apparatus via the network, wherein the application is operated using a result of a login attempt made using the login information, the result being sent from the server apparatus.

7. The image processing apparatus according to claim 1, wherein a web browser loaded on the image forming apparatus acquires the IC card identification information and sends the IC card identification information to a web application, and wherein the web application performs user authentication using a database in a server apparatus on a network to perform a login process for the web application.

* * * * *